United States Patent [19]
Baxter et al.

[11] Patent Number: 5,881,454
[45] Date of Patent: Mar. 16, 1999

[54] METHOD OF MAKING SINGLE-SIDED ELECTRONIC CONNECTOR

[75] Inventors: Scott W. Baxter, Moorpark; Jasmen Dorian, Glendale; Michael A. Rosales, Jr., La Canada, all of Calif.

[73] Assignee: Seagate Technology, Inc., Scotts Valley, Calif.

[21] Appl. No.: 756,278

[22] Filed: Nov. 25, 1996

[51] Int. Cl.$^6$ .................................................. H01R 9/00
[52] U.S. Cl. ............................................. 29/843; 360/97.01
[58] Field of Search ........................... 29/842, 843, 825; 360/97.01

[56] References Cited

U.S. PATENT DOCUMENTS

| | | |
|---|---|---|
| 4,908,915 | 3/1990 | Krum et al. . |
| 5,184,961 | 2/1993 | Ramirez et al. . |
| 5,370,556 | 12/1994 | Olsson ..................................... 439/681 |
| 5,392,175 | 2/1995 | Beecroft . |
| 5,420,733 | 5/1995 | Knighton et al. . |
| 5,466,171 | 11/1995 | Bixler et al. ............................. 439/378 |
| 5,500,779 | 3/1996 | Diel . |
| 5,509,197 | 4/1996 | Stone . |
| 5,543,982 | 8/1996 | Takagi et al. . |
| 5,594,600 | 1/1997 | Bruner et al. . |
| 5,624,279 | 4/1997 | Clark et al. ............................. 439/680 |
| 5,637,019 | 6/1997 | Crane, Jr. et al. ....................... 439/677 |
| 5,650,910 | 7/1997 | Winick et al. . |

*Primary Examiner*—Carl J. Arbes
*Attorney, Agent, or Firm*—Merchant Gould Smith Edell Welter & Schmidt

[57] ABSTRACT

A single-sided electronic connector for assembly to a printed circuit board assembly (PCBA) includes a connector housing having a pin supporting wall extending the width thereof, a plurality of conductive pins extending from an outboard side of the wall, a plurality of soldertails corresponding to the conductive pins extending from an inboard side of the wall, and a plurality of gripper arms which extend from an inboard side of the housing for receiving and securing an edge of the PCBA therein through an interference fit such that the soldertails engage only one side of the PCBA. Each gripper arm defines a slot having crush ribs into which the edge of the PCBA is inserted. A pair of mounting ears extend from a respective pair of gripper arms, and are configured to receive a mounting screw therethrough for attaching the electronic connector to a support structure. In an automated manufacturing process, an edge of the PCBA is inserted into the gripper arms of the electronic connector and the assembly is then run through an infrared reflow to solder the connector to the PCBA. The PCBA/electronic connector assembly is then hard-mounted to the support structure, such as a hard drive assembly, utilizing screws which extend through the slots of the mounting ears.

5 Claims, 3 Drawing Sheets

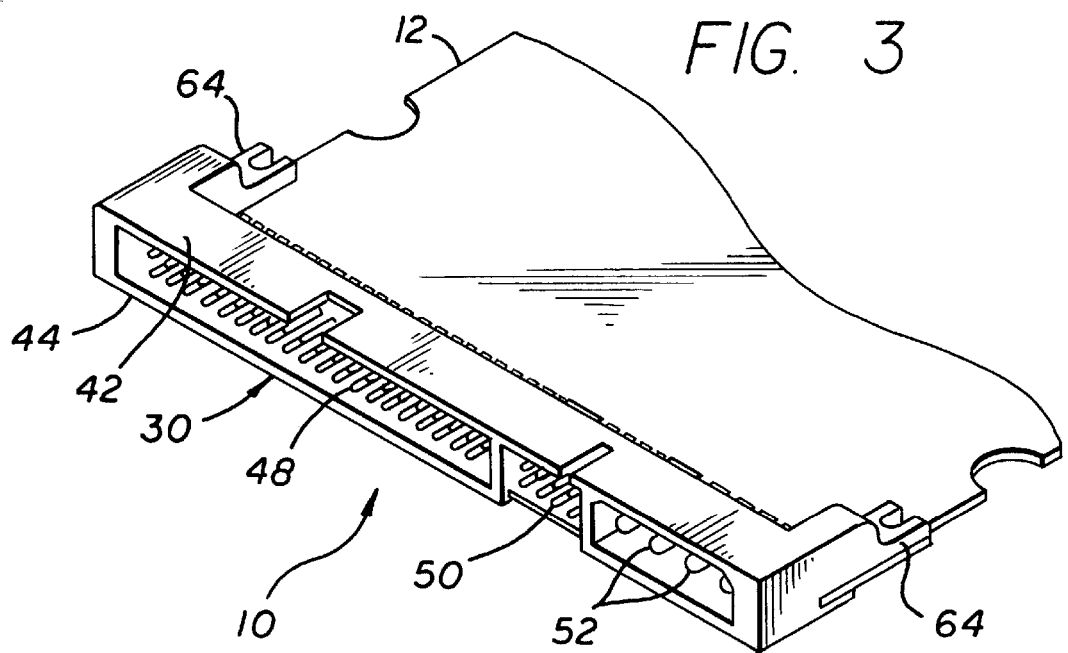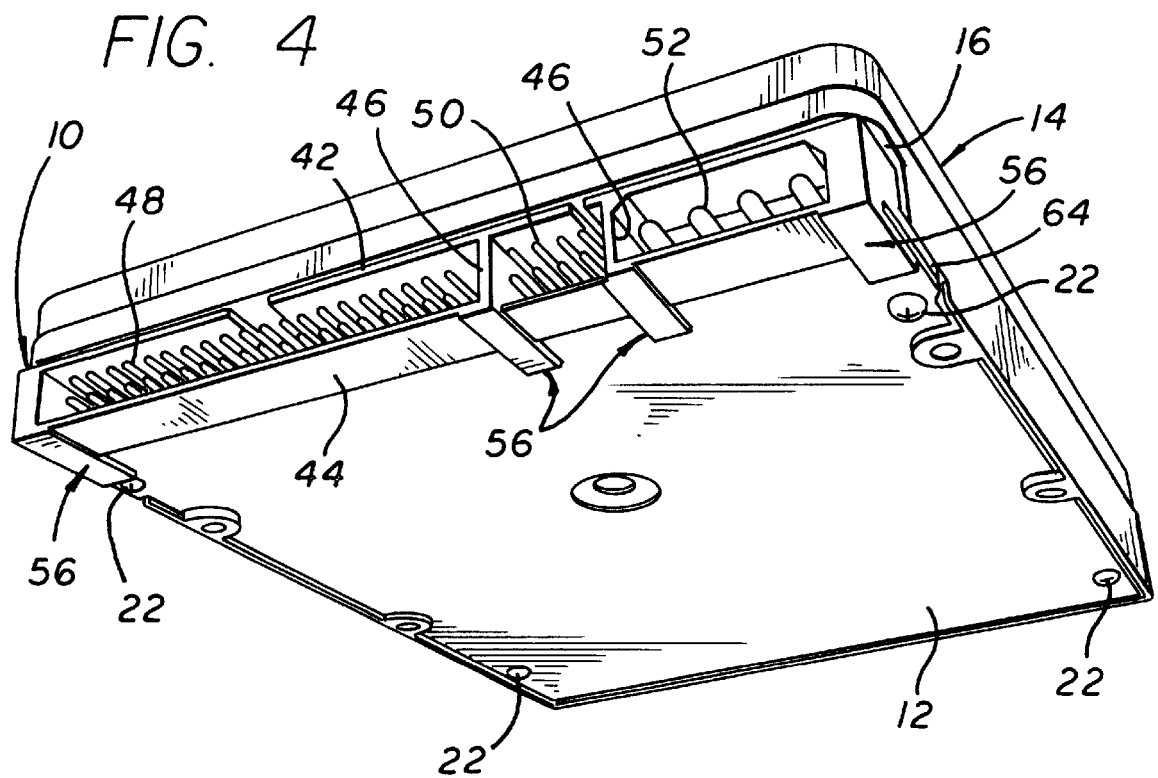

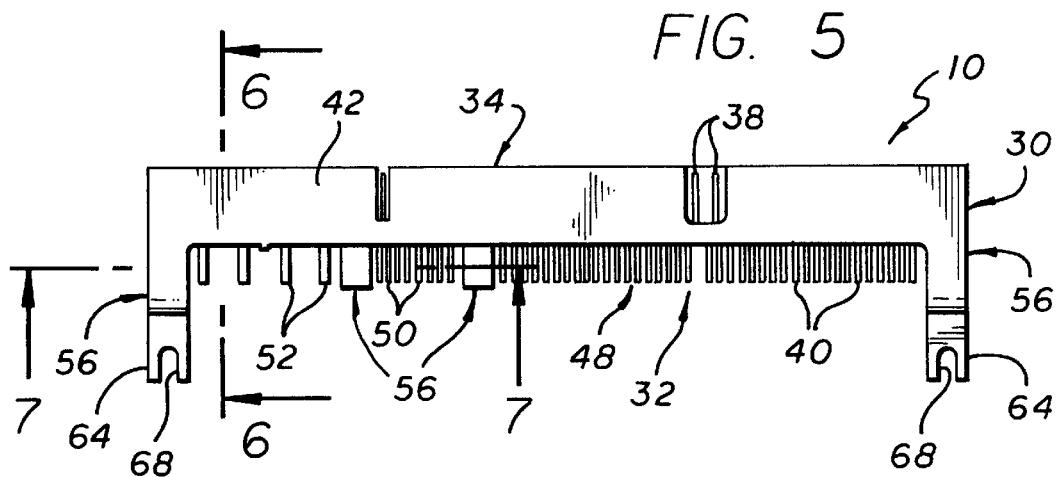
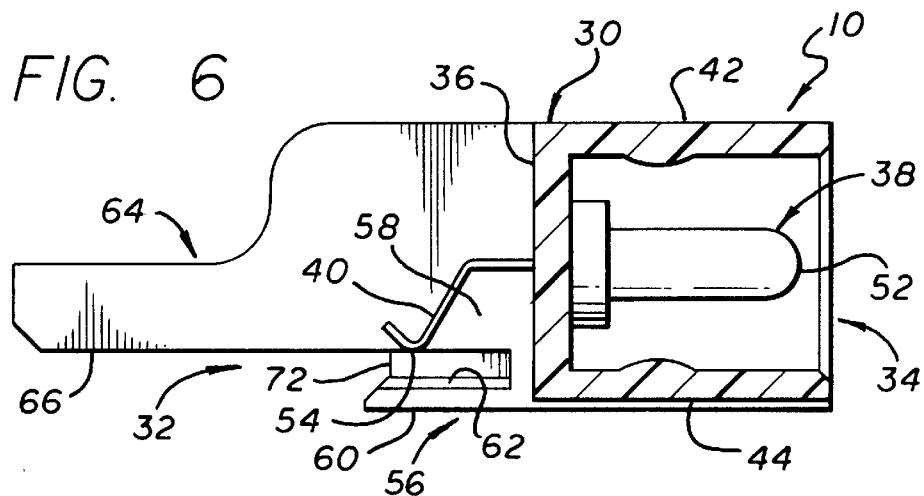
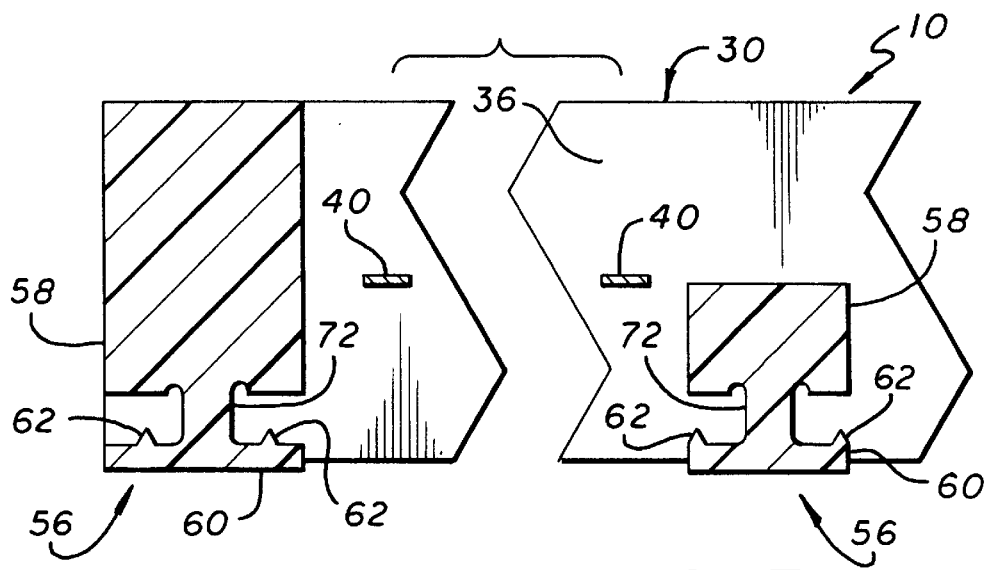

METHOD OF MAKING SINGLE-SIDED ELECTRONIC CONNECTOR

BACKGROUND OF THE INVENTION

This invention relates generally to an electronic connector associated with a printed circuit board assembly (PCBA). More specifically, the present invention relates to a single-sided electronic connector that is assembled to a PCBA through an interference fit, and which may be subsequently hard-mounted to a hard disk drive assembly through slots provided adjacent to aligned mounting holes of the PCBA.

In recent years microcomputer equipment, particularly personal and desk top computers, have become extremely popular for a wide variety of home, business and commercial uses. Such computers commonly include a main central processor unit having one or more memory storage disks. In many modern computers, the storage disk or disks, sometimes referred to as "hard disks," are provided as part of a Winchester-type disk drive unit having the storage disks supported in a stack on a rotary spindle within a substantially sealed disk drive housing. The disks are rotatably driven in unison by a small spindle motor, and one or more electromagnetic heads on a movable positioning arm are displaced by a precision stepper motor to traverse surfaces of the rotating disks for purposes of reading and writing data. Such Winchester-type disk drive units are generally preferred in comparison with so-called floppy-type disk drives due to their higher memory storage capacities and faster operating speeds.

Typically, such computer disk drive units or "hard drive assemblies" (HDA) include a housing having a base and a removable cover which collectively define a disk storage compartment therebetween. A shaft is fixed to the base and extends therefrom toward the housing cover, and one or more memory storage disks are mounted for rotation within the disk storage compartment about the shaft. The shaft and the memory storage disks comprise a memory storage unit which, with other related components situated within the disk storage compartment, are manufactured to very precise manufacturing specifications.

Often a printed circuit board assembly (PCBA) is mounted directly to a disk drive unit housing. An electronic connector is typically mounted to the PCBA prior to assembly of the PCBA to the disk drive unit, to provide an electronic interface between the disk drive unit or hard drive assembly and the main central processor unit. The electronic connector typically has a standard configuration, i.e., SCSI (small computer system interface), SCA (single connector attach) or AT and, in the past, has been press-fit to the PCBA. One disadvantage in such an assembly of the electronic connector to the PCBA is that automated assembly of these two components has not been possible. Of course, improvements to the design of the various components associated with the hard drive assembly, printed circuit board and electronic connector, which would facilitate automatic assembly of these components to one another would be considered by those in the industry to be highly desirable.

Accordingly, there has been a need for a novel assembly of electronic components which facilitates assembly of the PCBA to the electronic connector with no hard-mounting of such components to one another, and which further permits the hard-mounting of these components when assembled to the disk drive unit itself. Preferably an improved electronic connector would be provided that would permit automated pick and place of the connector onto the PCBA in accordance with efficient manufacturing techniques. Such an improved electronic connector must maintain the flexibility and versatility for modification into standard configurations (for example, SCSI, SCA or AT configurations), and must not be appreciably more expensive to manufacture than standard electronic connectors. The present invention fulfills these needs and provides other related advantages.

SUMMARY OF THE INVENTION

The present invention resides in a single-sided electronic connector for assembly to a printed circuit board assembly (PCBA) and an assembly of such electronic components to a support structure, and a related method of assembly. The electronic connector includes, generally, a non-conductive connector housing having an inboard side and an oppositely facing outboard side, and a pin supporting wall which extends the width thereof. A plurality of conductive pins extend generally perpendicularly from an outboard side of the pin supporting wall, and a plurality of soldertails which correspond to the conductive pins extend from an inboard side of the pin supporting wall. A plurality of gripper arms extend from the inboard side of the housing, for receiving and securing an edge of the PCBA therein through an interference fit such that the soldertails engage only one side of the PCBA.

In a preferred form of the invention, each soldertail includes a PCBA contact pad, and all of the contact pads are co-planar. Each gripper arm includes an upper portion and a lower flange which cooperatively define a slot therebetween into which the edge of the PCBA is inserted. To facilitate the interference fit between the PCBA and the electronic connector, crush ribs are provided within the PCBA edge-receiving slot of the gripper arms. A pair of mounting ears extend from a respective pair of the plurality of gripper arms. The mounting ears are configured to receiving a mounting screw therethrough for attaching the electronic connector to a support structure, such as a hard drive assembly (HDA) housing. Each mounting ear includes a planar PCBA engaging surface and an open-ended slot in an end thereof. The gripper arms and the mounting ears are integrally formed with the connector housing.

A method of assembling a single-sided electronic connector to a PCBA and a hard drive assembly comprises the steps of, generally, inserting an edge of the PCBA into the gripper arms of the electronic connector described above, soldering the connector to the PCBA, and hard-mounting the assembled connector and PCBA to the hard drive assembly. More specifically, the method includes the step of placing solder paste onto the solder pads provided on the PCBA. The inserting step includes the step of automated pick and place of the electronic connector onto the PCBA such that each soldertail engages a respective solder pad. The soldering step includes the step of running the assembled PCBA and electronic connector through an infrared reflow for the purpose of soldering the connector and other components to the PCBA. Once this is accomplished, the hard-mounting step includes the utilization of screws passing through the slots in the mounting ears and aligned apertures in the PCBA and the hard drive assembly.

The resulting assembly of electronic components comprises, broadly, a generally planar PCBA having a pair of mounting apertures, a support structure to which the PCBA is attached, the support structure (HDA) having a pair of apertures aligned with the PCBA mounting apertures, and a single-sided electronic connector having the above-described gripper arms extending from an inboard side of the housing for receiving and securing an edge of the PCBA therein through an interference fit. The pair of mounting ears which extend from a respective pair of the plurality of gripper arms each include a planar PCBA engaging surface and a slot in an end thereof. The mounting ear slots are aligned with the support structure apertures and the PCBA mounting apertures such that a mounted screw inserted therethrough and secured within the support structure apertures securely fixes the electronic connector and the PCBA to the support structure.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is a perspective view of the assembled electronic connector and PCBA, wherein the PCBA is inserted and held within gripper arms of the electronic connector through an interference fit;

FIG. 4 is a perspective view of the components shown in FIGS. 1–3 assembled to one another such that a pair of mounting screws provide the means for hard-mounting both the PCBA and the electronic connector to the hard drive assembly housing;

FIG. 5 is a top plan view of the single-sided electronic connector of FIGS. 1–4;

FIG. 6 is an enlarged sectional view taken generally along the line 6—6 of FIG. 5; and FIG. 7 is an enlarged fragmented sectional view taken generally along the line 7—7 of FIG. 5.

DETAILED DESCRIPTION OF THE PREFERRED EMBODIMENT

Figure 1:
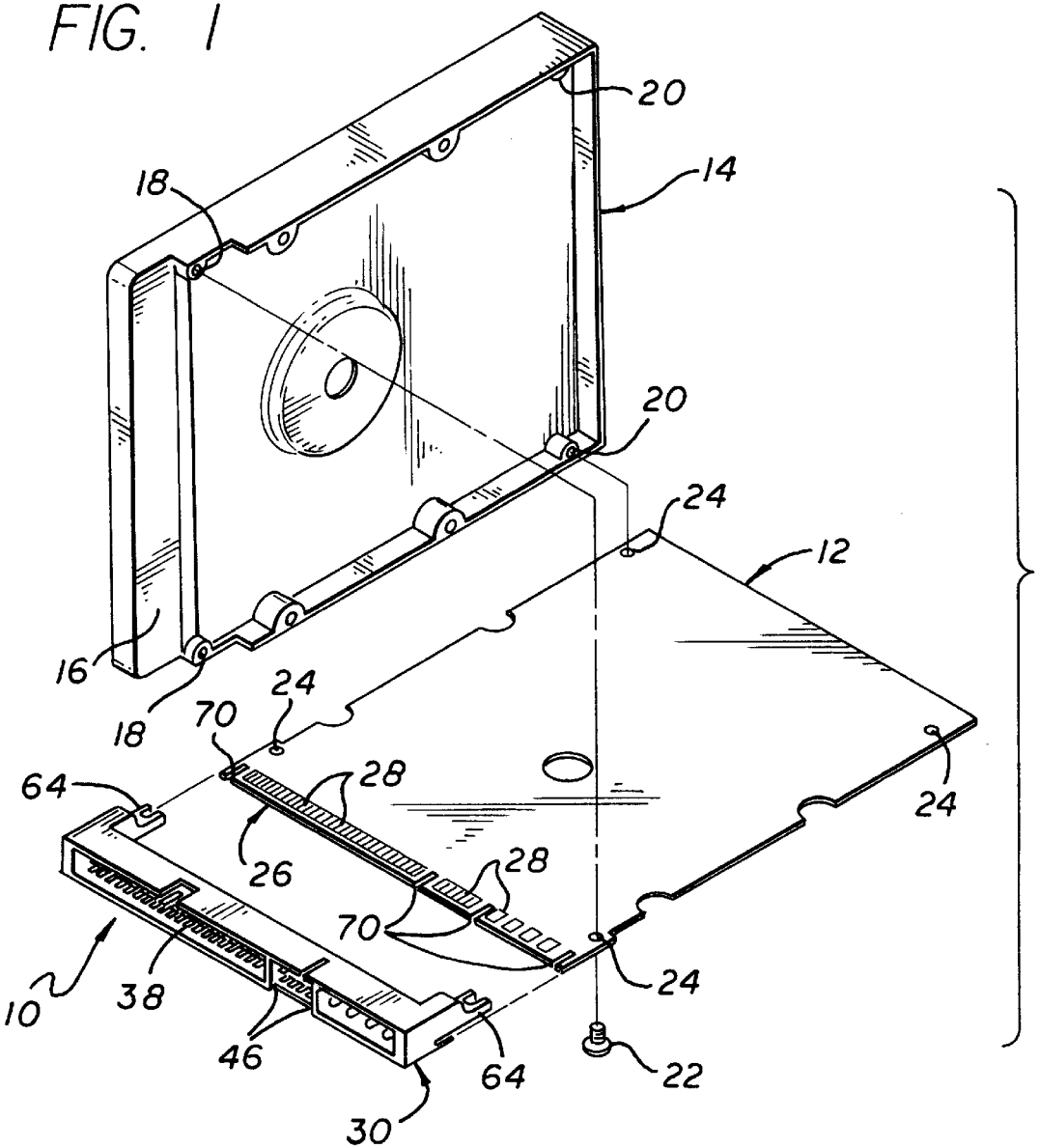
FIG. 1 is an exploded perspective view of an assembly of electronic components embodying the invention, specifically illustrating a printed circuit board assembly (PCBA) that is received through an interference fit by a single-sided electronic connector prior to being hard-mounted to a housing for a hard drive assembly.
Figure 2:
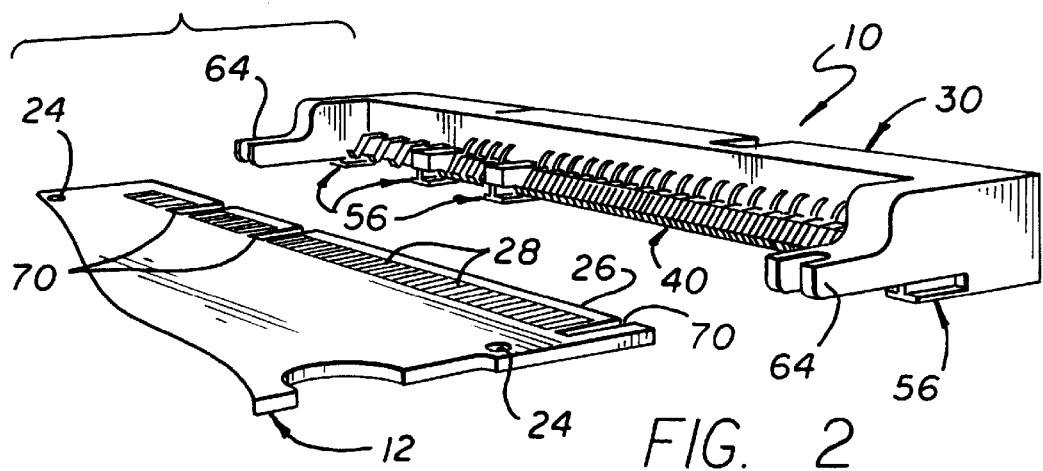
FIG. 2 is a perspective view of the electronic connector and the PCBA shown in FIG. 1 from a reverse angle.

As shown in the drawings for purposes of illustration, the present invention is concerned with a single-sided electronic connector, generally designated in the accompanying drawings by the reference number 10, which comprises a component of an electronic assembly that includes a printed circuit board assembly (PCBA) 12 and a support structure 14 to which the PCBA 12 and electronic connector 10 are mounted. In the accompanying drawings the support structure 14 is illustrated in the form of a housing for a disk drive unit or hard disk assembly (HDA).

The exemplary HDA housing 14 is typically constructed of a material such as aluminum and is configured to include a step portion 16 to accommodate the electronic connector 10 when the assembly of the electronic connector and the PCBA 12 is hard-mounted to the HDA housing 14. A pair of apertures 18 are provided adjacent to the step portion 16 as well as another set of apertures 20 at an opposite end of the HDA housing 14, which threadably receive mounting screws 22 for purposes of securing the PCBA 12 to the HDA housing 14.

The PCBA 12 is of standard construction and includes mounting apertures 24 therethrough which, when the PCBA 12 is properly aligned with the HDA housing 14, are aligned with the apertures 18 and 20 of the HDA housing. Along an edge 26 of the PCBA are a series of solder pads 28 through which electrical connection is made between the PCBA 12 and the electronic connector 10.

In accordance with the present invention, the electronic connector 10 comprises a non-conductive connector housing 30 that has an inboard side 32, an oppositely facing outboard side 34 and a pin supporting wall 36 that extends the width of the housing 30. A plurality of conductive pins 38 extend generally perpendicularly from an outboard side of the pin supporting wall 36, and a plurality of soldertails 40 corresponding to the conductive pins 38 extend from an inboard side of the pin supporting wall 36. On the outboard side 34 of the connector housing 30 are provided upper and lower pin enclosing walls 42 and 44, and a pair of lateral housing walls 46 which segment the conductive pins 38 into three distinct sections. The particular electronic connector 10 illustrated is an AT, 3-in-1 standard-type connector including a forty pin AT I/O interface 48, eight option pins 50, and four power pins 52. Each of the conductive pins 38 has a corresponding soldertail 40 that extends through the pin supporting wall 36. The soldertails 40 each include a PCBA contact pad 54. All of the soldertails 40 extending on the inboard side 32 of the connector housing 30 have PCBA contact pads 54 that are co-planar.

Molded integrally with the connector housing 30 and extending on the inboard side 32 thereof are a plurality of gripper arms 56 which are configured to receive and secure the edge 26 of the PCBA 12 therein through an interference fit such that the co-planar PCBA contact pads 54 of the soldertails 40 engage only one side of the PCBA, and specifically the solder pads 28 provided thereon. Each of the four gripper arms 56 shown in the exemplary electronic connector 10 includes an upper portion 58 and a lower flange 60 which cooperatively define a slot therebetween into which the edge 26 of the PCBA 12 is inserted. Extending from the lower flange 60 upwardly into the PCBA edge-receiving slot are pair of crush ribs 62. The upper ends of the crush ribs 62 are typically coined off as the edge 26 of the PCBA 12 is inserted into the slot in a manner ensuring a snug interference fit between the electronic connector 10 and the PCBA 12.

The two outermost gripper arms 56 are further each provided a mounting ear 64 that includes a planar PCBA engaging surface 66 and an open-ended slot 68 in an end thereof. When the edge 26 of the PCBA 12 is inserted into the slots provided in the gripper arms 56 between the upper portion 58 and the lower flange 60, the slots 68 of the mounting ears 64 are aligned with two mounting apertures 24 of the PCBA 12.

The electronic connector 10, so constructed, lends itself to automated pick and place of the connector 10 onto the PCBA 12, which greatly simplifies the assembly process. In this regard, solder paste is typically provided on the solder pads 28 of the PCBA 12, and automated machinery then simply plucks an electronic connector 10, places it over the edge 26 of the PCBA 12 and presses the two components together so that the edge 26 is inserted into the slots provided the gripper arms 56. In this regard, the PCBA 12 is provided with alignment slots 70 which receive an I-beam 72 within each of the four gripper arms 56, to ensure proper lateral positioning of the edge 26 of the PCBA 12 relative to the electronic connector 10. This ensures that the contact pads 54 of the soldertails 40 are placed adjacent to appropriate corresponding solder pads 28 of the PCBA. In order to solder the electronic connector 10 to the PCBA 12, the assembled PCBA and electronic connector are run through an infrared reflow in the standard manner. The assembled electronic connector 10 and PCBA 12 may then be hard mounted to the HDA housing 14 by placing the assembly adjacent to the HDA housing as shown in FIGS. 1 and 4 so that the mounting apertures 24 of the PCBA are aligned with the apertures 18 and 20 of the HDA housing. Mounting screws 22 may then be placed through the aligned apertures to secure the hard-mount the PCBA to the HDA housing 14 in a standard fashion. Notably, the electronic connector is simultaneously hard-mounted to the HDA housing because the mounting ears 64 are interposed between and at least partially surround the aligned apertures 18 of the HDA housing and the mounting apertures 24 of the PCBA.

From the foregoing it will be appreciated that the single-sided electronic connector 10 of the present invention allows automated assembly of the connector 10 to the PCBA 12. The automated assembly involves only one step due to the one-side feature of the connector 10, wherein all of the PCBA contact pads 54 of the soldertails 40 are co-planar. There is no hard mounting of the connector 10 to the PCBA, but rather these two components are held together simply through an interference fit which may be accomplished utilizing simple pick and place manufacturing techniques. Further, provision of the mounting ears 64 integrally molded with the gripper arms 56 and the housing 30 permits hard mounting of the electronic connector 10 to the HDA housing 14 simultaneously with hard mounting of the PCBA 12 thereto.

Although a particular embodiment of the invention has been described in detail for purposes of illustration, various modifications may be made without departing from the spirit and scope of the invention. Accordingly, the invention is not to be limited, except as by the appended claims.

We claim:

1. A method of assembling a single-sided electronic connector to a printed circuit board assembly (PCBA), the circuit board having an edge defining a longitudinal dimension, and a hard drive assembly (HAD), comprising the steps of:

providing an electronic connector including a non-conductive housing having an inboard side, an oppositely facing outboard side, a plurality of gripper arms extending from the inboard side of the housing in a transverse direction relative to the longitudinal edge of the circuit board each gripper arm receiving and securing an edge of the PCBA therein through an interference fit, and a pair of mounting ears extending from a respective pair of the plurality of gripper arms, the mounting ears each including a planar PCBA engaging surface and a slot in an end thereof opposite the housing;

inserting the edge of the PCBA into the gripper arms of the electronic connector;

soldering the connector to the PCBA; and hard-mounting the assembled connector and PCBA to the hard drive assembly.

2. The method of claim 1, wherein the providing step includes providing the housing with a pin supporting wall extending the width thereof, a plurality of conductive pins extending generally perpendicularly from an outboard side of the pin supporting wall, and a plurality of soldertails corresponding to the conductive pins and extending from an inboard side of the pin supporting wall, wherein the soldertails each have a PCBA contact pad, which contact pads are co-planar, and wherein during the inserting step the soldertails engage only one side of the PCBA.

3. The method of claim 2, wherein the hard-mounting step includes utilizing screws passing through the slots in the mounting ears and aligned apertures in the PCBA and the hard drive assembly.

4. The method of claim 2, including the step of placing solder paste on solder pads provided on the PCBA, and wherein the inserting step includes the step of automated pick and place of the electronic connector onto the PCBA such that each soldertail engages a respective solder pad.

5. The method of claim 4, wherein the soldering step includes the step of running the assembled PCBA and electronic connector through an infrared reflow.

* * * * *